May 12, 1970     S. McILHONE     3,511,548
APPARATUS FOR STORING AND DISPENSING STACKED ARTICLES
Filed March 25, 1968     2 Sheets-Sheet 1
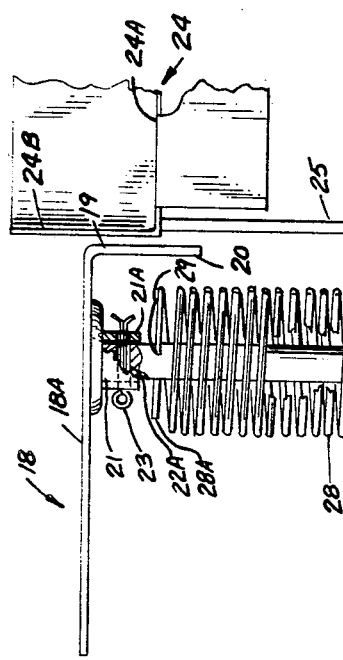
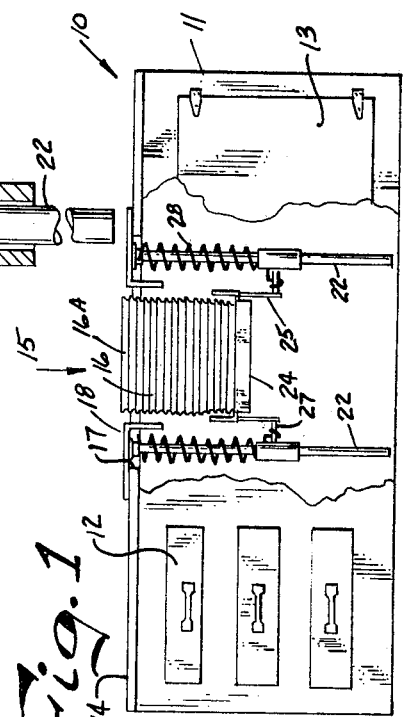
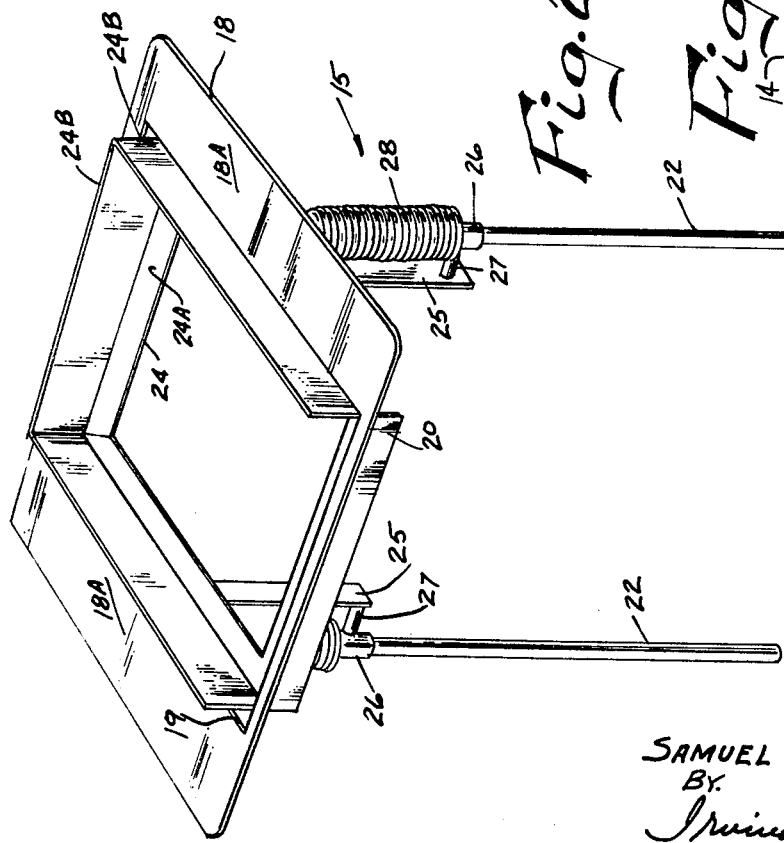
INVENTOR
SAMUEL McILHONE
BY
*Irving Seidman*
ATTORNEY May 12, 1970 S. McILHONE 3,511,548
APPARATUS FOR STORING AND DISPENSING STACKED ARTICLES
Filed March 25, 1968 2 Sheets-Sheet 2
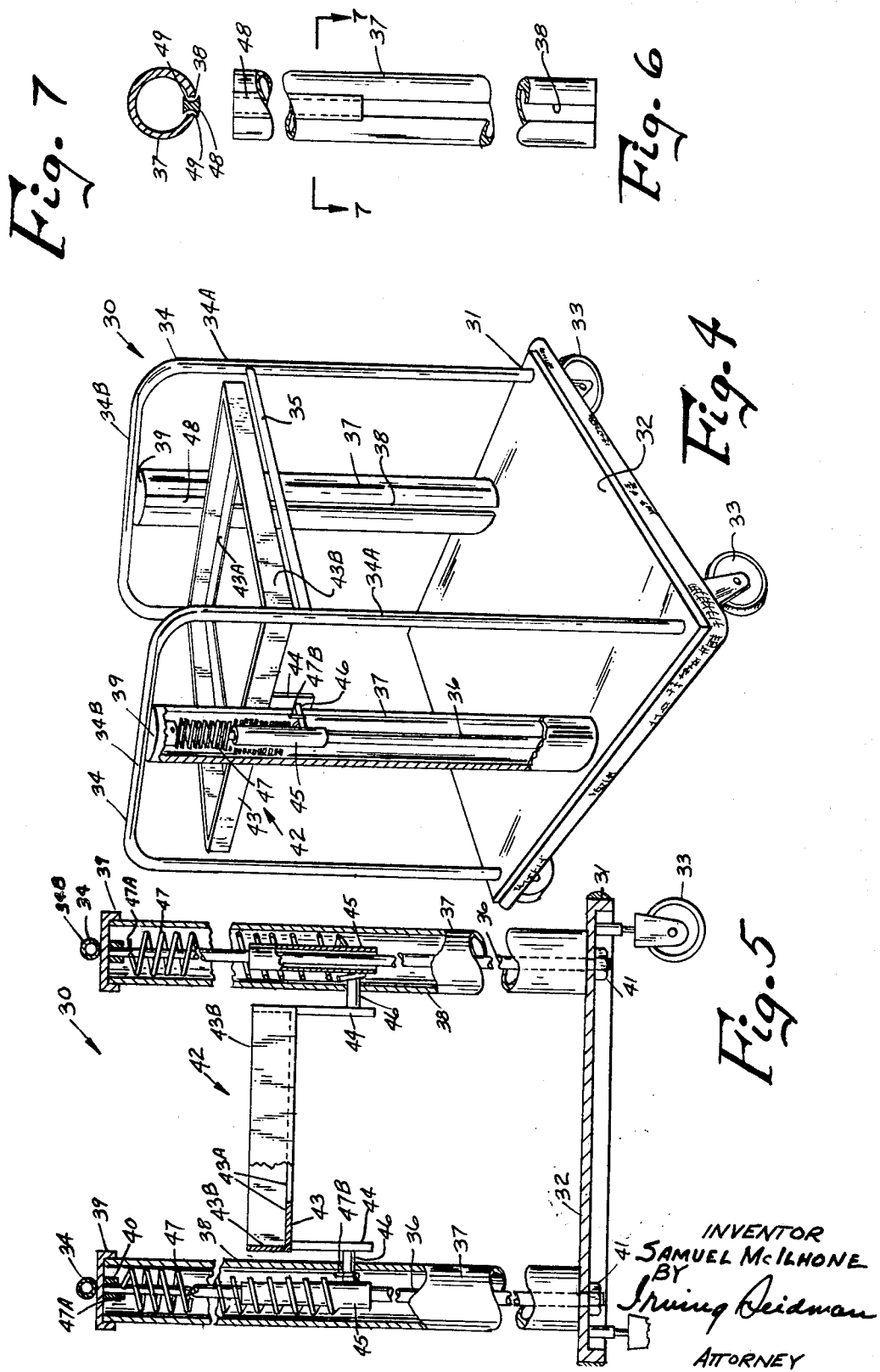
INVENTOR
SAMUEL McILHONE
BY
Irving Seidman
ATTORNEY United States Patent Office 3,511,548
Patented May 12, 1970

3,511,548
APPARATUS FOR STORING AND DISPENSING STACKED ARTICLES
Samuel McIlhone, Staten Island, N.Y., assignor to Levelator Corporation of America, Brooklyn, N.Y.
Filed Mar. 25, 1968, Ser. No. 715,895
Int. Cl. A47b 9/02; A47f 1/00
U.S. Cl. 312—71                               9 Claims

ABSTRACT OF THE DISCLOSURE

This disclosure is directed to an apparatus for storing and dispensing stacked articles, and more specifically to an apparatus having a frame on which there is supported a pair of oppositely disposed guide rods and an article supporting means mounted for movement therealong. Operatively connected to the article supporting means is a calibrated spring means for counterbalancing the weight of a column of articles stacked thereon in a manner whereby the uppermost article of such stack of articles is presented at a predetermined level above the frame each time an article is dispensed.

PRIOR ART

Apparatuses for storing and dispensing stacked articles, e.g. dishes, trays, cups, saucers and the like, used in food serving establishments and for storing and dispensing of stacked articles generally, heretofore comprise relatively complex and intricate mechanisms for counterbalancing the weight of the stacked articles so that in dispensing, the uppermost article is presented to a predetermined level. Evidence of the prior art structures are the following U.S. patents—2,251,873; 2,251,874; 2,251,875; 2,449,892; 2,461,638; 2,560,928; 2,601,295; 2,649,992; 2,919,168 and 2,928,639.

In the prior art structures as evidenced by the foregoing cited U.S. patented structures, the mechanism for counterbalancing the weight of the stacked articles was required to be constructed as an integral part of the housing or cabinet containing the same, and comprised of various complex systems of chains, counterweights, pulleys and/or springs. Because the prior known mechanisms were intrically formed as a part of the housing, the serving counters utilized in conjunction with such mechanisms were required to be specifically designed for each individual use. Also the existing serving counters could not be readily modified and/or supplemented with a mechanism for storing and dispensing stacked articles such as dishes, trays and the like.

It is therefore an object of this invention to provide an improved apparatus for storing and/or dispensing stacked articles which can be readily incorporated into either an existing serving counter and/or a newly constructed serving counter.

Another object is to provide for a readily knock-down apparatus for storing and/or dispensing a column of stacked articles and which can be readily disposed for use in an existing serving line or counter.

Another object is to provide an apparatus for storing and dispensing columns of stacked articles which is rendered readily portable.

Another object of the invention is to provide an apparatus for storing and dispensing stack articles which is relatively simple in construction, which can be readily fabricated, and which is positive in operation.

SUMMARY OF INVENTION

The foregoing objects and other features and advantages of this invention are attained by a storing and dispensing apparatus comprising essentially of a means defining a frame for supporting thereon a pair of oppositely disposed guide rods. An article supporting means in the form of a carrier is movably mounted on and between the opposed guide rods. The carrier is constructed to support thereon a column of stacked articles. A spring means is operatively connected to the carrier to counterbalance the weight of the stacked articles. The spring means are calibrated so that they extend and distend incremental amounts proportional to the weight of the respective articles so that the topmost article is always presented to a predetermined level as the respective articles are dispensed from the stack.

A feature of this invention resides in an apparatus for storing and dispensing articles from a stack in a manner whereby the uppermost article is presented to a predetermined level and which apparatus can be readily incorporated into a serving line.

Another feature of this invention resides in the provision of utilizing a relatively simply constructed calibrated spring only to effect the incremental displacement of the stack of articles each time an article is dispensed.

Another feature of the invention resides in the provision that the structure of the apparatus is such that it can be readily inserted through an opening of an existing counter or it can be incorporated in a readily mobile stand.

Another feature of the invention resides in the provision that the apparatus can be readily knocked down for ease of shipping, packing and/or storing.

Other features and advantages will become more readily apparent when considered in view of the specification and drawings in which:

FIG. 1 illustrates a front view of an existing serving counter with the apparatus of the present invention applied thereto.

FIG. 2 is a detail perspective of the apparatus applied to the counter of FIG. 1.

FIG. 3 is a fragmentary elevation view of the apparatus of FIG. 2.

FIG. 4 is a perspective view of a modified form of the invention.

FIG. 5 is a sectional view taken along line 5—5 on FIG. 4.

FIG. 6 is a detail view of a component part of the apparatus of FIGS. 4 and 5.

FIG. 7 is a plan view of the component part of FIG. 6.

Referring to the drawings there is shown in FIG. 1 a serving counter 10 typical to those making up a serving line in a cafeteria, restaurant or the like. It comprises essentially of a cabinet 11 construction having drawers 12, undercounter storage space 13 and the like. Frequently such counters are also provided with a steam table to maintain the comestibles to be served warm, or as might be required cold, by refrigeration.

Generally such counters 10 are provided with a surface 14 on which the utensils such as trays, dishes and the like are stacked. Usually such utensils and trays are simply stacked on a portion of the open counter top.

In accordance with this invention a means 15 is provided whereby the trays, dishes and the like 16 may be stored and dispensed from a well or interior portion of a counter 10 in a manner so that the uppermost tray or dish 16A in a stack of such articles 16 is presented to a predetermined level relative to the counter top 14 each time an article 16 is to be dispensed. In this manner the articles 16 may be maintained in a substantially concealed position within a well which enhances the sanitation of such article. Also such articles 16 may be preheated by utilizing suitable heaters within the cabinet.

Referring to FIGS. 2 and 3 there is shown the dispensing apparatus 15 which can be removably disposed within an appropriate opening 17 formed in the counter top 14 of the cabinet 10. Such opening 17 may be made in the cabinet during the initial construction thereof, or such opening 17 may be readily formed in existing cabinet tops to receive the apparatus 15 of FIG. 2.

As shown, the apparatus 15 comprises a frame 18 defined by a laterally extending flange 18A defining an opening 19 defined therein. The opening 19 is further circumscribed by a depending flange 20 integrally formed with the lateral flange portion 18A.

Oppositely disposed and connected to the undersurface of the lateral flanges 18A is a socket 21 for detachably receiving a guide rod 22. The socket 21 is provided with a transversely extending pin hole 21A which is arranged to align with a bore 22A formed in the upper end of the respective guide rods 22. Thus the guide rods 22 are each detachably secured by a suitable fastener such as a pin, screw, bolt or the like 23 extending through the pin hole 21A and the aligner bore 22A.

An article supporting means in the form of a carrier 24 is arranged to be movably mounted relative to the frame 18 and the associated guide rods 22. In the illustrated embodiment the carrier 24 is defined by a member having an inturned flange portion 24A adapted to support a column of stacked items 16 thereon, e.g. trays, dishes and the like. The carrier 24 may also be provided with a vertical extending flange 24B to facilitate the positioning of the stacked articles thereof.

Connected to the opposite sides of the carrier 24 is a depending bracket 25 to which there is connected a sleeve 26 which is disposed in sliding relationship to the respective guide rods 22. As shown a connecting means in the form of a lug or lateral extension 27 fixedly connects the sleeve 26 to the bracket 25 of the carrier.

To counterbalance the load of any stack or column of articles 16 disposed on the carrier 24, there is provided a calibrated tension spring 28 adjacent each guide rod 22. As illustrated the calibrated tension spring 28 is disposed about the guide rod 22 and has one end 28A thereof anchored to a fixed point, e.g. a hole 29 formed in the upper end of the guide rod 22. The other end 28B of the spring 28 is movably anchored to the sleeve or the connector 27 between the sleeve 26 and the bracket 25 as shown in FIG. 3.

With the apparatus of FIG. 2 assembled, as described and illustrated, it will be noted that the same can be readily utilized with an existing counter simply by inserting the same through the opening 17 formed in the counter top. As best seen in FIG. 1, the lateral flanges 18A of the apparatus 15 provide the support thereof within the opening 17. When the articles such as trays 16 are stacked on the carrier 24 the weight of the stacked articles 16 cause the carrier 24 to sink within the opening 17 and to extend the respective springs 28. However, the springs 28 are so calibrated that they will extend and distend in proportion to the weight of the articles 16 stacked thereon so that the uppermost article 16A of the stack will be presented to the level substantially that of the counter top 14. Thus as each article is successively removed from the column of stack articles 16, the springs 28 will effect a counterbalancing of the remaining stacked articles so that the uppermost article 16A is always presented to the predetermined level.

With the construction described, it will be noted that the apparatus 15 can be readily assembled and dissembled simply by inserting or removing the pin 23 and disconnecting the ends 28A, 28B of the spring 28 from their respective anchoring points.

FIGS. 5 to 7 illustrate a modified form of the invention. In this form the dispensing apparatus 30 is illustrated as applied to a readily portable cart 31. The cart 31 comprises a base 32 suitably supported on casters or wheels 33 by which it can be readily rolled over a supporting surface. The sides of the cart in the illustrated embodiment are defined by inverted U-shaped rods or bars 34 to define an open frame structure. Cross bars or ties 35 may be provided between corresponding leg portions 34A of the U-shaped rods 34. If desired, the walls of the cart 31 may be defined by imperforate walls or panels to form a closed cart or cabinet like structure.

In the illustrated embodiment, oppositely disposed guide rods 36 are interconnected between the base member 31 and the cross leg portion 34B of the side members 34. Each guide rod 36 is preferably enclosed within a tubular housing 37 which is formed with an elongated slotted opening 38 facing the inside of the cabinet.

Referring to FIG. 5 the tubular housing 37 is secured between a cap 39 fixedly secured to the cross leg portion 34B of the side members 34 and the base member 31. Connected to the cap 39 member is a socket 40 which is adapted to receive the upper end of the guide rod 36. The bottom end of the guide rod 36 is suitably secured to the base member 31, e.g. by a nut 41 threaded to an end portion of the rod 36 which extends through the base member 31.

A carrier 42 for supporting thereon a column of stacked articles is movably supported on and between the respective guide rods 36. As shown the carrier 42 is defined by rectangularly disposed members 43 having an inturned flange portion 43A and a circumscribing upright flange portion 43B. While the carrier 42 is illustrated as rectangular, it will be understood that it may assume any desired shape.

Dependently connected to opposed side portions of the carrier 42 are depending brackets 44 to which there are connected a sleeve 45 which is slidably disposed relative to the guide rods 36. The connection 46 between the sleeve 45 and the bracket 44 is disposed within the slot 38 of the respective tubular housing 37.

The weight of the column or stack of articles adapted to be supported on the carrier 42 is counterbalanced by calibrated tension springs 47. As shown a calibrated tension spring 47 is disposed in each of the housings 37 and each spring 47 has one end 47A fixedly anchored to the guide rod or frame, as hereinbefore described, and has its other end 47B movably anchored to the sleeve or its connector 46.

Thus in operation, whenever a stack of trays or the like is supported on the carrier 42, the springs 47 will be extended in proportion to the weight of the articles thereon so that the uppermost article will be presented to a predetermined level. As each uppermost article is dispersed, the spring means 47 are proportionally distended so that the column is raised an amount sufficient to position the uppermost article at the predetermined level, as hereinbefore described.

To conceal the portion of the elongated slot 38 above the connector 46, there is provided an arcuate cover 48 which is adapted to be received in the upper portion of the slot. Preferably the cover 48 is formed to appear as a portion of the housing 37 and it is provided with elongated grooves 49 in the opposed elongated sides which are adapted to frictionally receive the corresponding edges of the slot 38.

From the foregoing is will be apparent that the storing and dispensing apparatus is readily simple in construction and can be readily assembled with a maximum of ease; and that the means for counterbalancing the stack of articles comprises a relatively simple calibrated spring.

While the invention has been described with respect to several embodiments thereof, it will be understood that variations and modifications may be made without departing from the spirit or scope of this invention.

What is claimed is:

1. A dispenser for storing and individually dispensing stacked articles comprising:
   means defining a frame adapted to support said dispenser over an opening formed in a countertop, said frame means including a pair of oppositely disposed and vertically extending guide rods depending from said frame means, said guide rods being adapted to extend into the opening of the countertop, an article supporting means, means for slidably mounting said article supporting means on said guide rods for movement therealong, said article supporting means being adapted to support thereon a stack of superposed articles, a single calibrated tension spring disposed about each of said guide rods whereby said spring is disposed below said frame, each of said tension spring means having one end fixed adjacent said frame means and the other end thereof anchored to said means for slidably mounting said article supporting means whereby said springs are extended when loaded and distended when the load on said article supporting means is lightened incremental amounts in proportion to the weight of the column of stacked articles supported on said article supporting means whereby the uppermost article of said stack of articles is presented at a predetermined level each time an article is removed from said stack.

2. The invention as defined in claim 1 wherein said article supporting means comprises a carrier having an inturned flange portion for supporting the stack of articles on said carrier, oppositely disposed brackets depending from said carrier, a guide sleeve slidably mounted on each of said guide rods, and means fixedly connecting each of said guide sleeves to a corresponding bracket whereby said sleeve functions to guide said carrier as it is vertically displaced as the articles supported on said carrier are dispensed.

3. The invention as defined in claim 2 wherein said frame means comprise, a base member, vertically disposed side forming members connected to said base member, said guide rods being disposed between said side forming members and said base member, and wheel means connected to said base member to render said frame means readily portable over a supporting surface.

4. The invention as defined in claim 3 and including a tubular housing circumscribing each of said guide rods and corresponding tension spring, said housing having an elongated slot formed therein for accommodating the connecting means between said sleeve and said corresponding bracket.

5. The invention as defined in claim 4 and including a cover means for concealing a portion of said elongated slot.

6. The invention as defined in claim 5 wherein said cover means includes an elongated member which is arcuate in cross-section to conform to the curvature of said housing, and said elongated member having an elongated groove formed in the longitudinal edges thereof to receive the corresponding edge portion of said slot.

7. A readily knock-down article dispenser adapted to be installed in an opening formed in the top of a serving counter comprising, a frame having laterally extending flange portions adapted to support said dispenser on the top of a serving counter circumscribing the opening therein, a pair of oppositely disposed guide rods, means for detachably connecting each of said guide rods to said flange portions whereby said guide rods depend therefrom, a carrier for supporting thereon a column of stacked articles to be dispensed, and means for rendering said carrier adjustably disposed along said guide rods, said latter means including a tension spring means operatively associated with each of said guide rods and said carrier whereby said spring means are extended and distended incremental amounts in proportion to the weight of the column of stack articles supported on said carrier so that the uppermost article of said stack of articles is presented at a predetermined level each time an article is removed from said stack.

said means for detachably connecting said guide rods comprises a tubular socket secured to the under surface of said flange portions, said socket having a transversely extending hole, and said guide rods each having a bore extending transversely thereof, said bore being adapted to be aligned with the hole formed in the respective sockets, and a removable pin inserted through said hole and aligned bore to detachably connect the guide rod to said frame.

8. The invention as defined in claim 7 wherein said means for adjustably disposing said carrier along said guide rods comprises, oppositely disposed brackets dependingly connected to said carrier opposite each of said guide rods, a sleeve slidably mounted on each of said guide rods, and connecting means fixedly securing said sleeve to a corresponding bracket, and said spring means having one end anchored to said guide rod and the other end anchored about said connecting means.

9. The invention as defined in claim 8, wherein said carrier comprises and endless member having an inturned flange portion for supporting the stack of articles thereon, and an upwardly extending flange portion circumscribing said endless member.

References Cited

UNITED STATES PATENTS

| | | | |
|---|---|---|---|
| 2,461,638 | 2/1949 | Gibbs | 312—71 |
| 2,812,990 | 11/1957 | Smith | 312—71 |
| 3,168,198 | 2/1965 | Shelley. | |
| 3,190,453 | 6/1965 | Shelley | 211—49 |
| 3,327,655 | 6/1967 | MacKay | 312—71 |
| 3,331,337 | 7/1967 | MacKay | 312—71 |
| 3,428,185 | 2/1969 | Vorndran | 211—49 |

CASMIR A. NUMBERG, Primary Examiner

U.S. Cl. X.R.

108—136